(12) United States Patent
Woolley et al.

(10) Patent No.: US 8,736,551 B2
(45) Date of Patent: May 27, 2014

(54) TOUCH-SENSOR-CONTROLLER SENSOR HUB

(75) Inventors: Adrian Woolley, Pleasanton, CA (US); John Logan, Danville, CA (US); Kent Long, Orinda, CA (US); Paul Iannacito, Hercules, CA (US)

(73) Assignee: Atmel Corporation, San Jose, CA (US)

( * ) Notice: Subject to any disclaimer, the term of this patent is extended or adjusted under 35 U.S.C. 154(b) by 127 days.

(21) Appl. No.: 13/548,049

(22) Filed: Jul. 12, 2012

(65) Prior Publication Data

US 2014/0015763 A1   Jan. 16, 2014

(51) Int. Cl.
*G06F 3/038* (2013.01)
*G09G 5/00* (2006.01)

(52) U.S. Cl.
USPC .......................................... 345/158; 345/173

(58) Field of Classification Search
USPC .................................. 345/156, 158, 173–179
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Ricardo L Osorio
(74) *Attorney, Agent, or Firm* — Baker Botts LLP

(57) ABSTRACT

In one embodiment, a method includes controlling a touch sensor of a device. The control of the touch sensor includes a first processing cycle executed by the controller that comprises acquisition of touch-sensor signals from the touch sensor; a second processing cycle executed by the controller that comprises pre-processing of the touch-sensor signals; and a third processing cycle executed by the controller that comprises processing of the touch-sensor signals to determine whether a touch or proximity input has occurred with respect to the touch sensor. If the touch or proximity input has occurred with respect to the touch sensor, a location of the touch or proximity input is determined. The method also includes controlling other sensors of the device. The control of the other sensors includes one or more fourth processing cycles executed by the controller concurrently with the first processing cycle or the second processing cycle.

20 Claims, 6 Drawing Sheets

US 8,736,551 B2

TOUCH-SENSOR-CONTROLLER SENSOR HUB

TECHNICAL FIELD

This disclosure generally relates to controllers.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
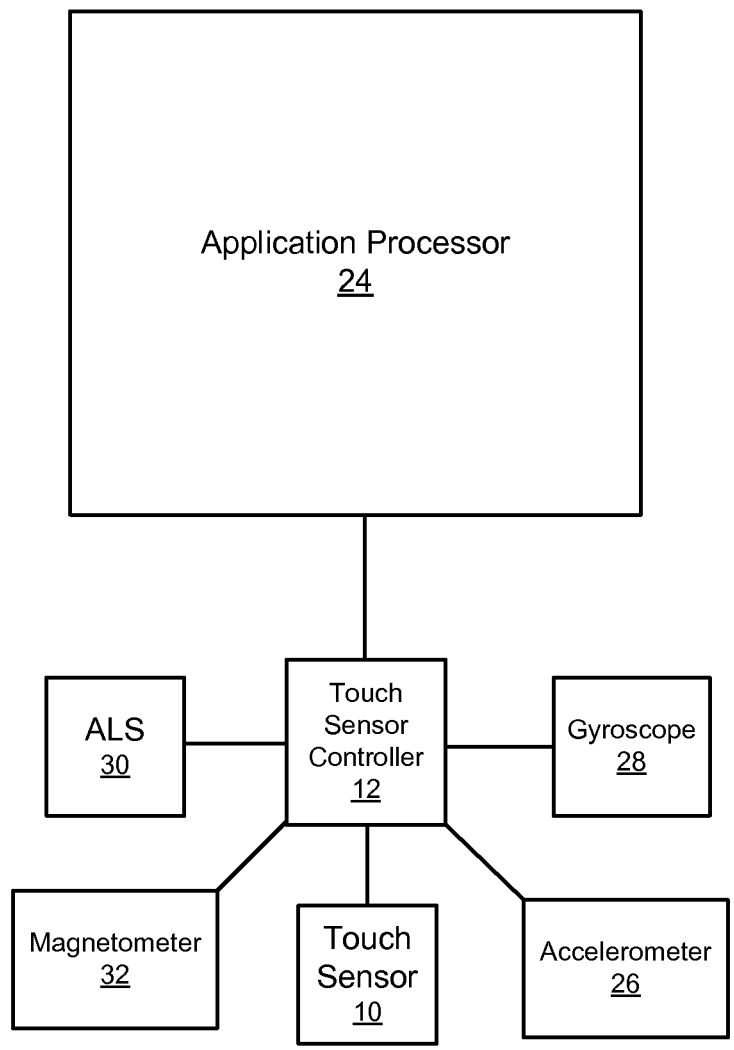
FIG. 1 illustrates an example touch-sensor-controller sensor hub.

FIG. 1 illustrates an example touch-controller-based sensor hub. In particular embodiments, a device may include an application processor 24, a touch sensor 10, a touch-sensor controller 12, and one or more other sensors 26-32. Application processor 24 is a primary central-processing unit (CPU) of the device and may perform a relatively high percentage of the data processing of the device. Touch-sensor controller 12 is coupled to application processor 24, as well as touch sensor 10 and other sensors 26-32. Herein, reference to other sensors encompasses any suitable sensor other than a touch sensor, such as for example inertial sensors, as described below. In the example of FIG. 1, touch-sensor controller 12 may function as a sensor hub controlling touch sensor 10 and the other sensors 26-32 coupled to it. In particular embodiments, the device may include one or more sensors 26-32 that detect or measure data about the environment in which the device operates. Sensors 26-32 may detect and measure one or more characteristics of the environment of the device, such as for example acceleration, movement, orientation, contact, pressure, force, vibration, temperature, humidity, proximity, or any other suitable characteristic. As an example and not by way of limitation, sensors 26-32 may include one or more of an accelerometer 26, a gyroscope 28, an ambient light sensor (ALS) 30, or a magnetometer 32. In particular embodiments, sensors 26-32 may be implemented mechanically, electronically, or capacitively. Although this disclosure describes and illustrates a particular device having a particular number of particular components and sensors in a particular arrangement, this disclosure contemplates any suitable device having any suitable number of any suitable components and sensors in any suitable arrangement.

As described below, touch-sensor controller 12 acquires touch-sensor signals through particular signals generated by touch-sensor controller 12 and transmitted to touch sensor 10. Touch-sensor controller 12 receives and processes touch-sensor signals detected by touch sensor 10 resulting from the transmitted signals. In particular embodiments, touch-sensor controller 12 may acquire or process sensor signals from other sensors 26-32 corresponding to a change of environment of the device. As an example and not by way of limitation, touch-sensor controller 12 may periodically poll accelerometer 26 or gyroscope 28 for sensor signals to determine whether movement of the device has occurred. As another example, the touch-sensor controller 12 may poll ALS 30 or magnetometer 32 for sensor signals to determine whether a change environment of the device has occurred, such as for example moving the device to an enclosed area or metallic carrying case. In particular embodiments, touch-sensor controller 12 may serially control each sensor 26-32 or any combination thereof in parallel.

In particular embodiments, touch-sensor controller 12 may communicate with application processor 24 in response to the data detected or measured by one or more sensors 10 and 26-32 and processed by touch-sensor controller 12. As an example and not by way of limitation, touch-sensor controller 12 may transmit a signal to application processor 24 in response to sensor signals from one or more other sensors 26-32 being higher than a pre-determined threshold indicating a change of the environment of the device. In particular embodiments, application processor 24 may be in a sleep mode in an absence of data to be processed. Application processor 24 may wake from a sleep mode in response to receiving the signal from touch-sensor controller 12. In particular embodiments, application processor 24 may communicate with other sensors 26-32 through touch-sensor 12 in response to the received signal. In other particular embodiments, application processor 24 may initiate a pre-determined function to be performed by the device in response to the signal from touch-sensor controller 12. As an example and not by way of limitation, application processor 24 may deactivate the display of the device in response to receiving signals that the device is in an enclosed area such as for example a pocket of a user.

Figure 2:
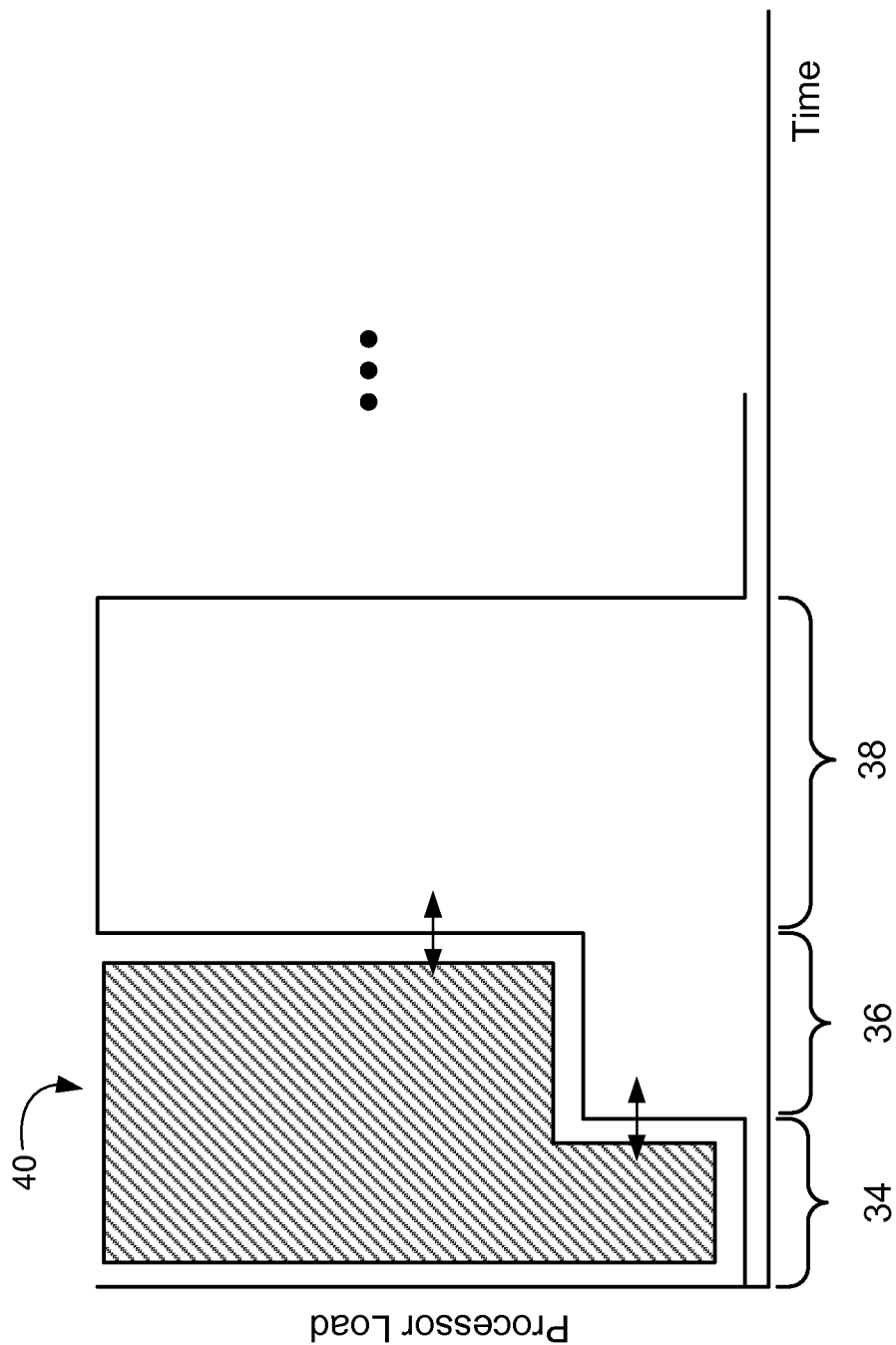
FIG. 2 illustrates an example timing diagram for an example touch-sensor controller sensor hub.

FIG. 2 illustrates an example timing diagram for an example touch-sensor controller sensor hub. In the example of FIG. 2, the processing load of the touch-sensor controller is illustrated as a function of time. In particular embodiments, the touch-sensor controller may control the touch sensor in three processing cycles 34-38. As an example and not by way of limitation, first processing cycle 36 may acquire touch-sensor signals from the touch sensor; second processing cycle 38 may pre-process the touch-sensor signals; and third processing cycle 38 may process the touch-sensor signals to determine whether a touch or proximity input has occurred with respect to the touch sensor. If a touch or proximity input has occurred, the touch-sensor controller may determine the location of the touch or proximity input. In particular embodiments, the processor load of the touch-sensor controller may be relatively low for acquisition of touch-sensor signals during first processing cycle 34, while the processor load of the touch-sensor controller may be substantially maximized for processing of the touch-sensor signals during third processing cycle 38. The processor load of the touch-sensor controller for pre-processing touch-sensor signals during second processing cycle 36 may be relatively higher than acquiring the touch-sensor signals, but relatively lower than processing the touch-sensor signals.

In the example of FIG. 2, the other sensors may be controlled during a fourth processing cycle 40 executed by the controller concurrently with the first processing cycle 34 or the second processing cycle 36 executed by the touch-sensor controller. In particular embodiments, concurrent with controlling the touch sensor, the touch-sensor controller may control one or more other sensors. As an example and not by way of limitation, the touch-sensor controller may control and process signals from one or more other sensors (e.g. accelerometer, gyroscope, etc.) to determine a change in the environment of the device during fourth processing cycle 40. Although this disclosure describes and illustrates a particular timing of the touch-sensor controller having a particular number of processing cycles performed in a particular sequence and each processing cycle having a particular function, this disclosure contemplates any suitable timing of the touch-sensor controller having any suitable number of processing cycles performed in any suitable sequence and each processing cycle having any suitable function. In particular embodiments, the processor load of the touch-sensor controller is substantially maximized during control of the touch-sensor and the other sensors.

The duration of each of the processing cycles 34-38 may be adjustable based at least in part on whether one or more touch or proximity inputs occur with respect to the touch sensor. As an example and not by way of limitation, the duration of third processing cycle 38 may increase when multiple touch or proximity inputs occur within a touch-sensitive area of the touch sensor. In particular embodiments, the duration of and the functions performed during fourth processing cycle 40 may be based at least in part on the duration of first processing cycle 34 or second processing cycle 36. As an example and not by way of limitation, calibration of the other sensors and acquisition of sensor signals from the other sensors may be performed during fourth processing cycle 40 for a relatively long first processing cycle 34 or second processing cycle 36. As another example, for a relatively short first processing cycle 34 or second processing cycle 36, acquisition of sensor signals from the other sensors may be performed during fourth processing cycle 40 without performing calibration of the other sensors. In particular embodiments, the amount of processing associated with the other sensors may be scaled based at least in part on the duration of first processing cycle 34, second processing cycle 36, third processing cycle 38, or a combination thereof. In other particular embodiments, the functions performed by the other sensors may be prioritized based at least in part on the duration of fourth processing cycle 40. Although this disclosure describes particular functions being performed on the other sensors, this disclosure contemplates any suitable function being performed on the other sensors.

Figure 3:
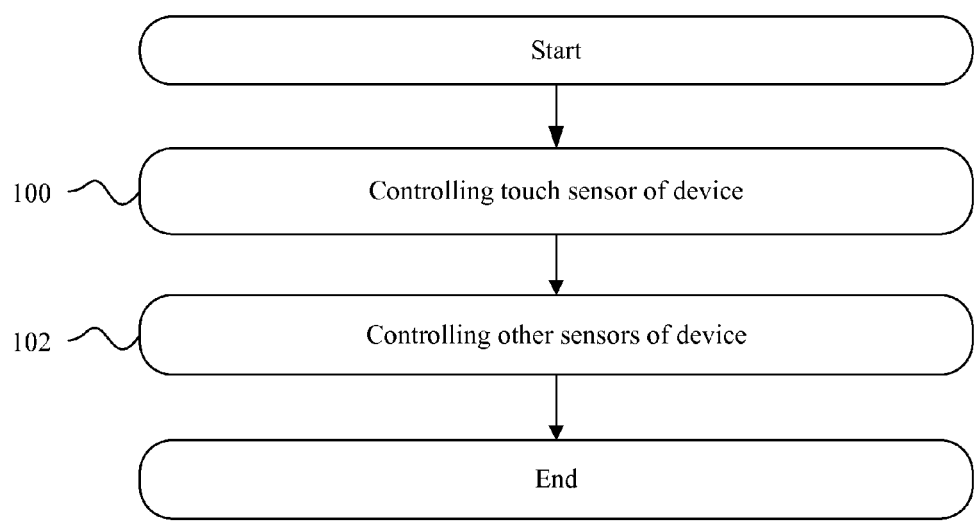
FIG. 3 illustrates an example method for controlling sensors.

FIG. 3 illustrates an example method for controlling sensors. The method may start at step 100, where a touch sensor of a device is controlled by a controller. In particular embodiments, a first processing cycle executed by the controller includes acquiring touch-sensor signals from the touch sensor; a second processing cycle includes pre-processing the touch-sensor signals; and a third processing cycle includes processing the touch-sensor signals to determine whether a touch or proximity input has occurred with respect to the touch sensor. In particular embodiments, if a touch or proximity input has occurred with respect to the touch sensor, a location of the touch or proximity input may be determined. At step 102, one or more other sensors of the device is controlled by the controller, at which point the method may end. In particular embodiments, a fourth processing cycle concurrently executed by the controller with the first processing cycle or the second processing cycle includes controlling of the other sensors. Controlling of the other sensors may include acquiring and processing signals from the other sensors. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
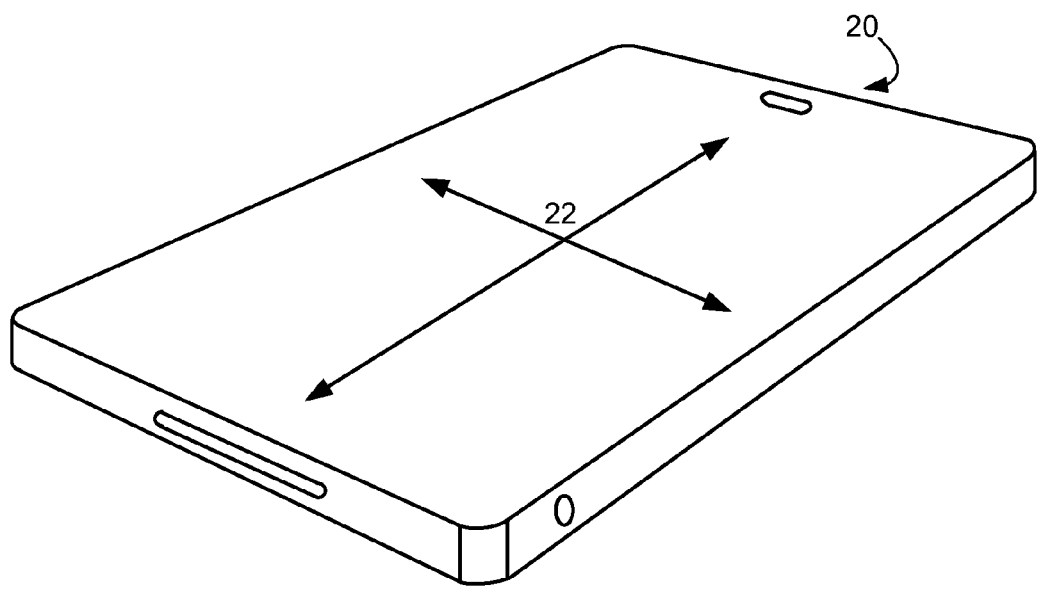
FIG. 4 illustrates an example mobile device.

FIG. 4 illustrates an example device with the example touch-sensor-controller sensor hub and touch sensor of FIG. 1. As an example and not by way of limitation, example device 20 may include a smartphone, a personal-digital assistant (PDA), a tablet computer, a laptop computer, a desktop computer, a kiosk computer, a satellite navigation device, a portable media player, a portable game console, a point-of-sale device, a game controller, a remote control, another suitable device, a suitable combination of two or more of these, or a suitable portion of one or more of these. Example device 20 may include a touch sensor, described below, with a touch-sensitive area 22 proximate to a surface of device 20 and a touch-sensor-controller sensor hub. As described above, the touch-sensor-controller sensor hub may process measurement signals to detect the presence and location of one or more touch or proximity inputs within touch-sensitive area 22. In particular embodiments, example device 20 may be a computing system, as described below.

Figure 5:
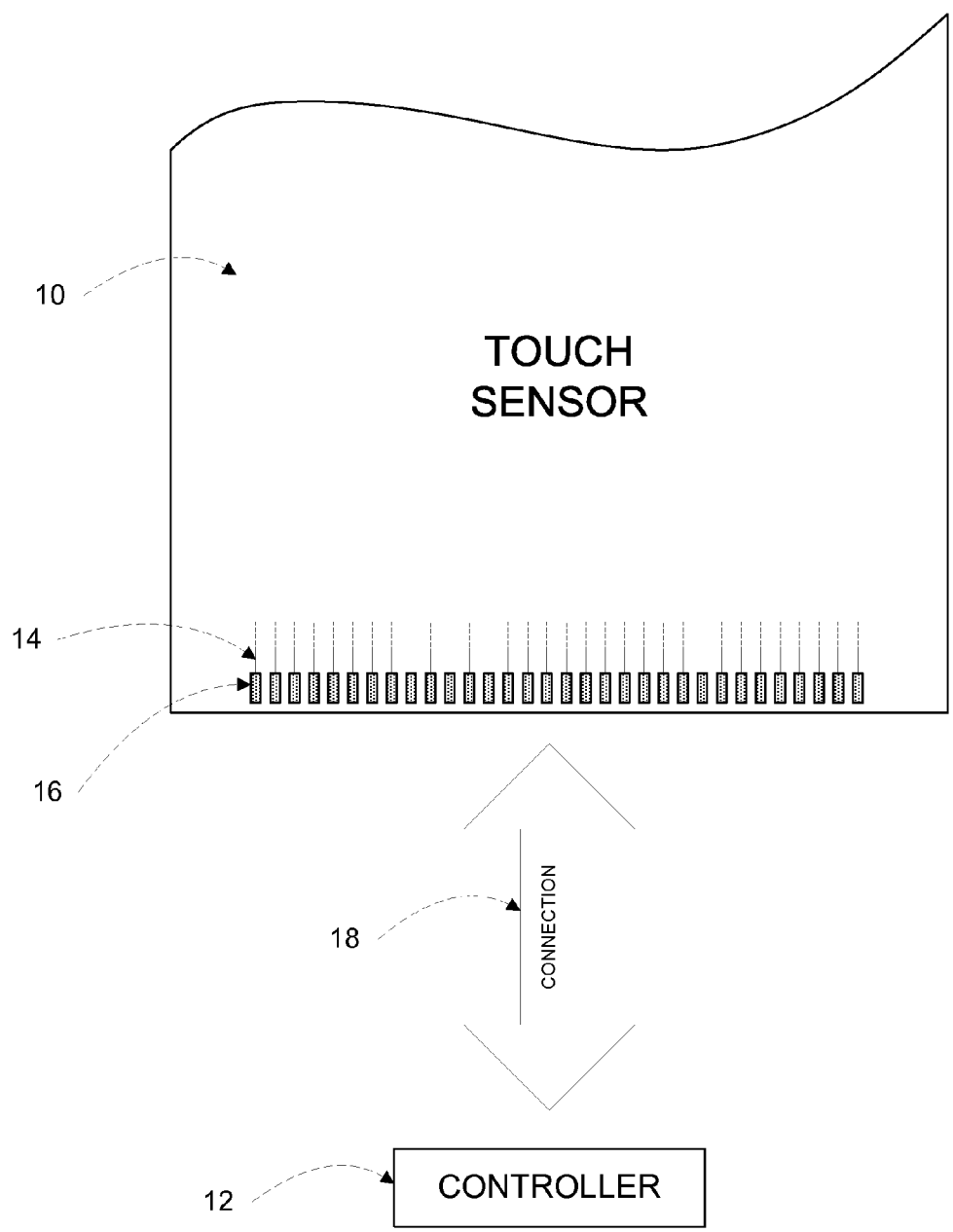
FIG. 5 illustrates an example touch sensor with an example touch-sensor-controller sensor hub.

FIG. 5 illustrates an example touch sensor with an example touch-sensor controller. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 6:
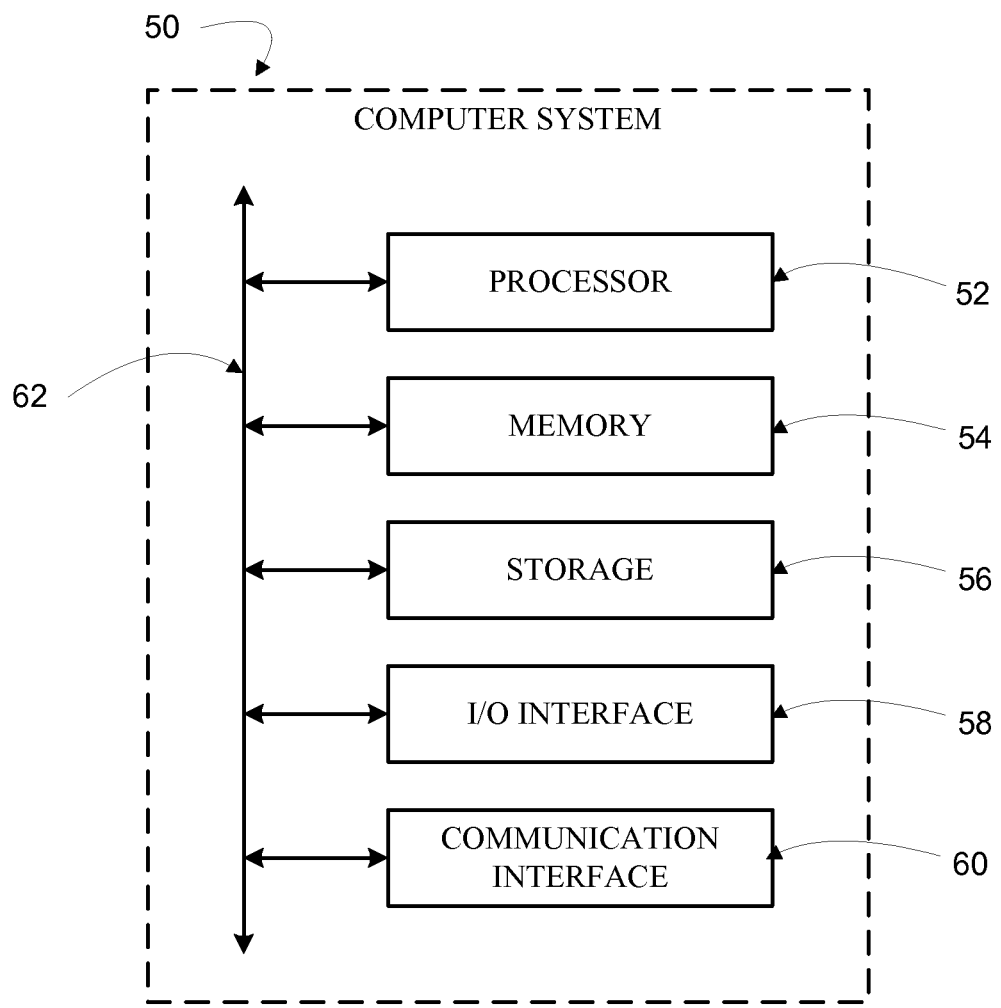
FIG. 6 illustrates an example computer system.

FIG. 6 illustrates an example computer system. In particular embodiments, one or more computer systems 50 perform one or more steps of one or more methods described or illustrated herein. In particular embodiments, one or more computer systems 50 provide functionality described or illustrated herein. In particular embodiments, software running on one or more computer systems 50 performs one or more steps of one or more methods described or illustrated herein or provides functionality described or illustrated herein. Particular embodiments include one or more portions of one or more computer systems 50.

This disclosure contemplates any suitable number of computer systems 50. This disclosure contemplates computer system 50 taking any suitable physical form. As example and not by way of limitation, computer system 50 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 50 may include one or more computer systems 50; be unitary or distributed; span multiple locations; span multiple machines; span multiple datacenters; or reside in a cloud, which may include one or more cloud components in one or more networks. Where appropriate, one or more computer systems 50 may perform without substantial spatial or temporal limitation one or more steps of one or more methods described or illustrated herein. As an example and not by way of limitation, one or more computer systems 50 may perform in real time or in batch mode one or more steps of one or more methods described or illustrated herein. One or more computer systems 50 may perform at different times or at different locations one or more steps of one or more methods described or illustrated herein, where appropriate.

In particular embodiments, computer system 50 includes a processor 52, memory 54, storage 56, an input/output (I/O) interface 58, a communication interface 60, and a bus 62. In particular embodiments processor 52 may be an application processor illustrated in FIG. 1. Although this disclosure describes and illustrates a particular computer system having a particular number of particular components in a particular arrangement, this disclosure contemplates any suitable computer system having any suitable number of any suitable components in any suitable arrangement.

In particular embodiments, processor 52 includes hardware for executing instructions, such as those making up a computer program. As an example and not by way of limitation, to execute instructions, processor 52 may retrieve (or fetch) the instructions from an internal register, an internal cache, memory 54, or storage 56; decode and execute them; and then write one or more results to an internal register, an internal cache, memory 54, or storage 56. In particular embodiments, processor 52 may include one or more internal caches for data, instructions, or addresses. Although this disclosure describes and illustrates a particular processor, this disclosure contemplates any suitable processor.

In particular embodiments, memory 54 includes main memory for storing instructions for processor 52 to execute or data for processor 52 to operate on. As an example and not by way of limitation, computer system 50 may load instructions from storage 56 or another source (such as, for example, another computer system 50) to memory 54. Processor 52 may then load the instructions from memory 54 to an internal register or internal cache. To execute the instructions, processor 52 may retrieve the instructions from the internal register or internal cache and decode them. During or after execution of the instructions, processor 52 may write one or more results (which may be intermediate or final results) to the internal register or internal cache. Processor 52 may then write one or more of those results to memory 54. In particular embodiments, processor 52 executes only instructions in one or more internal registers or internal caches or in memory 54 (as opposed to storage 56 or elsewhere) and operates only on data in one or more internal registers or internal caches or in memory 54 (as opposed to storage 56 or elsewhere). One or more memory buses (which may each include an address bus and a data bus) may couple processor 52 to memory 54. Bus 62 may include one or more memory buses, as described below. In particular embodiments, one or more memory management units (MMUs) reside between processor 52 and memory 54 and facilitate accesses to memory 54 requested by processor 52. Although this disclosure describes and illustrates particular memory, this disclosure contemplates any suitable memory.

In particular embodiments, storage 56 includes mass storage for data or instructions. Storage 56 may include removable or non-removable (i.e., fixed) media, where appropriate. Storage 56 may be internal or external to computer system 50, where appropriate. In particular embodiments, storage 56 is non-volatile, solid-state memory. Where appropriate, storage 56 may include one or more storages 56. Although this disclosure describes and illustrates particular storage, this disclosure contemplates any suitable storage.

In particular embodiments, I/O interface 58 includes hardware, software, or both providing one or more interfaces for communication between computer system 50 and one or more I/O devices. Computer system 50 may include one or more of these I/O devices, where appropriate. One or more of these I/O devices may enable communication between a person and computer system 50. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 58 for them. Where appropriate, I/O interface 58 may include one or more device or software drivers enabling processor 52 to drive one or more of these I/O devices. I/O interface 58 may include one or more I/O interfaces 58, where appropriate. Although this disclosure describes and illustrates a particular I/O interface, this disclosure contemplates any suitable I/O interface.

In particular embodiments, communication interface 60 includes hardware, software, or both providing one or more interfaces for communication (such as, for example, packet-based communication) between computer system 50 and one or more other computer systems 50 or one or more networks. As an example and not by way of limitation, communication interface 60 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 60 for it. Although this disclosure describes and illustrates a particular communication interface, this disclosure contemplates any suitable communication interface.

In particular embodiments, bus 62 includes hardware, software, or both coupling components of computer system 50 to each other. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising
by a controller, controlling a touch sensor of a device, the control of the touch sensor comprising:
a first processing cycle executed by the controller that comprises acquisition of touch-sensor signals from the touch sensor;
a second processing cycle executed by the controller that comprises pre-processing of the touch-sensor signals; and
a third processing cycle executed by the controller that comprises processing of the touch-sensor signals to determine:
whether a touch or proximity input has occurred with respect to the touch sensor;
if the touch or proximity input has occurred with respect to the touch sensor, a location of the touch or proximity input; and
by the controller, controlling one or more other sensors of the device, the control of the other sensors comprising one or more fourth processing cycles executed by the controller at least in part concurrently with the first processing cycle or the second processing cycle.

2. The method of claim 1, wherein the pre-processing comprises applying one or more digital filters to the touch-sensor signals.

3. The method of claim 1, wherein the other sensors comprises an ambient light sensor, a magnetometer, an accelerometer, a gyroscope, or a combination thereof.

4. The method of claim 1, further comprising adjusting a duration of each of the first and second processing cycles based at least in part to acquiring touch-sensor signals corresponding to one or more touch or proximity inputs.

5. The method of claim 4, further comprising adjusting a duration of the fourth processing cycles based on the amount of time of the first, second, and third processing cycles.

6. The method of claim 1, wherein the fourth processing cycles comprising:
acquiring a sensor signal from the other sensors; and
processing the sensor signal from the other sensors to determine at least in part a change of an environment of the device.

7. The method of claim 1, wherein the control of the touch sensor and the other sensors substantially maximizes a processing load of the controller.

8. A computer-readable non-transitory storage medium embodying logic that is operable when executed to:
control a touch sensor of a device, the control of the touch sensor comprising:
a first processing cycle executed by a controller that comprises acquisition of touch-sensor signals from the touch sensor;
a second processing cycle executed by the controller that comprises pre-processing of the touch-sensor signals; and
a third processing cycle executed by the controller that comprises processing of the touch-sensor signals to determine:
whether a touch or proximity input has occurred with respect to the touch sensor;
if the touch or proximity input has occurred with respect to the touch sensor, a location of the touch or proximity input; and
control one or more other sensors of the device, the control of the other sensors comprising one or more fourth processing cycles executed by the controller at least in part concurrently with the first processing cycle or the second processing cycle.

9. The medium of claim 8, wherein the logic is further configured to apply one or more digital filters to the touch-sensor signals.

10. The medium of claim 8, wherein the other sensors comprises an ambient light sensor, a magnetometer, an accelerometer, a gyroscope, or a combination thereof.

11. The medium of claim 8, wherein the logic is further configured to adjust a duration of each of the first and second processing cycles based at least in part to acquiring touch-sensor signals corresponding to one or more touch or proximity inputs.

12. The medium of claim 11, wherein the logic is further configured to adjust a duration of the fourth processing cycles based on the amount of time of the first, second, and third processing cycles.

13. The medium of claim 8, wherein the logic is further configured to:
acquire a sensor signal from the other sensors; and
process the sensor signal from the other sensors to determine at least in part a change of an environment of the device.

14. The medium of claim 8, wherein the control of the touch sensor and the other sensors substantially maximizes a processing load of the controller.

15. A device comprising:
a controller;
a touch sensor coupled to the controller;
one or more other sensors coupled to the controller; and
a computer-readable non-transitory storage medium embodying logic that is operable when executed to:
control the touch sensor of the device, the control of the touch sensor comprising:
a first processing cycle executed by the controller that comprises acquisition of touch-sensor signals from the touch sensor;
a second processing cycle executed by the controller that comprises pre-processing of the touch-sensor signals; and
a third processing cycle executed by the controller that comprises processing of the touch-sensor signals to determine:
whether a touch or proximity input has occurred with respect to the touch sensor; and
if the touch or proximity input has occurred with respect to the touch sensor, a location of the touch or proximity input; and
control one or more other sensors of the device, the control of the other sensors comprising one or more fourth processing cycles executed by the controller at least in part concurrently with the first processing cycle or the second processing cycle.

16. The device of claim 15, wherein the logic is further configured to apply one or more digital filters to the touch-sensor signals.

17. The device of claim 15, wherein the other sensors comprises an ambient light sensor, a magnetometer, an accelerometer, a gyroscope, or a combination thereof.

18. The device of claim 15, wherein the logic is further configured to adjust a duration of each of the first and second processing cycles based at least in part to acquiring touch-sensor signals corresponding to one or more touch or proximity inputs.

19. The device of claim 18, wherein the logic is further configured to adjust a duration of the fourth processing cycles based on the amount of time of the first, second, and third processing cycles.

20. The device of claim 15, wherein the logic is further configured to:
acquire a sensor signal from the other sensors; and
process the sensor signal from the other sensors to determine at least in part a change of an environment of the device.

* * * * *